United States Patent [19]
Murayama et al.

[11] Patent Number: 6,075,659
[45] Date of Patent: Jun. 13, 2000

[54] OPTICAL PICKUP APPARATUS AND METHOD OF MANUFACTURE THEREOF, OPTICAL DISK APPARATUS AND METHOD OF MANUFACTURE THEREOF, AND INJECTION MOLDING DIE

[75] Inventors: Tomohiro Murayama, Yokohama; Hiroyuki Hata, Mino; Kazuhiko Mori, Tokyo; Akira Morimoto, Yokohama, all of Japan

[73] Assignee: Kabushiki Kasiha Toshiba, Kawasaki, Japan

[21] Appl. No.: 09/290,167

[22] Filed: Apr. 13, 1999

[30] Foreign Application Priority Data

| Apr. 15, 1998 | [JP] | Japan | 10-105066 |
| Dec. 25, 1998 | [JP] | Japan | 10-371335 |
| Dec. 25, 1998 | [JP] | Japan | 10-371337 |

[51] Int. Cl.[7] .................................................. G02B 7/02
[52] U.S. Cl. .......................... 359/813; 369/244; 425/542
[58] Field of Search ................................ 369/244, 44.14; 359/811, 813; 425/542

[56] References Cited

U.S. PATENT DOCUMENTS

| 5,517,362 | 5/1996 | Kasuga et al. | 359/811 |
| 5,521,762 | 5/1996 | Tomiyama et al. | 359/814 |
| 5,724,337 | 3/1998 | Kawano et al. | 369/244 |

FOREIGN PATENT DOCUMENTS 5-189788  7/1993  Japan.

*Primary Examiner*—Georgia Epps
*Assistant Examiner*—Timothy Thompson
*Attorney, Agent, or Firm*—Pillsbury Madison & Sutro LLP

[57] ABSTRACT

An injection molding die comprising a lower die and an upper die for manufacturing an objective lens drive unit, comprises a plurality of gates formed on the lower die in position perpendiculars to the direction of opening and closing the lower die and the upper die for allowing resin to flow into the cavity formed of the lower die and the upper die and a plurality of runners each with an end thereof connected to the corresponding gate and the other end thereof formed on the upper die, wherein each of the runners including the end-to-end portion thereof is formed inclined toward the upper die.

9 Claims, 7 Drawing Sheets

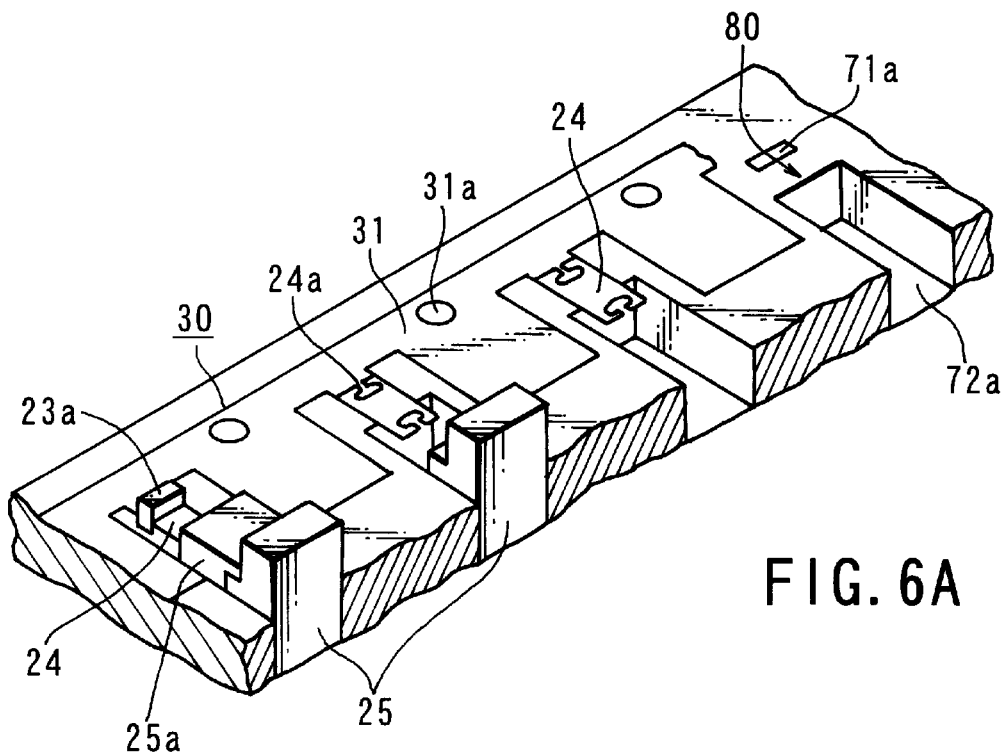
FIG. 6A
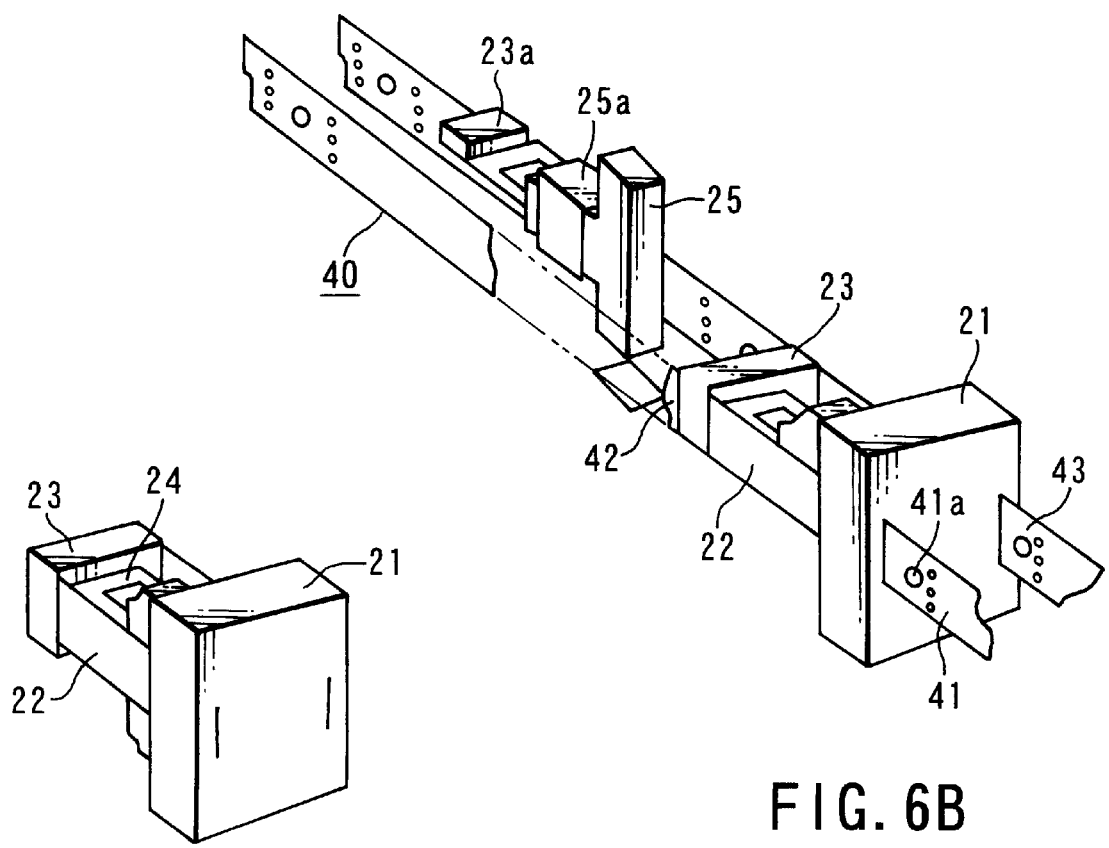
FIG. 6B
FIG. 6C

OPTICAL PICKUP APPARATUS AND METHOD OF MANUFACTURE THEREOF, OPTICAL DISK APPARATUS AND METHOD OF MANUFACTURE THEREOF, AND INJECTION MOLDING DIE

BACKGROUND OF THE INVENTION

The present invention relates to an objective lens drive unit for used in an optical disk apparatus or the like, an optical pickup apparatus having the objective lens drive unit built therein, an optical disk apparatus having the optical pickup apparatus built therein and a method of manufacture thereof, or more in particular to the same unit and the same apparatuses having an improved mass producibility and accuracy.

Also, the present invention relates to a tracking leaf spring array and a focusing leaf spring array for manufacturing a tracking leaf spring array and a focusing leaf spring array, respectively, built in the objective lens drive unit, and an injection molding die for manufacturing the objective lens drive unit.

An optical disk apparatus in which information is recorded or reproduced by radiating the laser beam on an optical disk mounts thereon an optical pickup apparatus for radiating the laser beam on the optical disk, receiving the laser beam reflected from the optical disk and converting it into an electrical signal. The optical pickup apparatus is composed of a light source, an objective lens drive unit and a photo detector. The focusing and tracking operation of the objective lens drive unit is controlled by the spring force and the electromagnetic force in such a manner as to correctly project the focal point of the objective lens on the optical disk.

The conventional objective lens drive unit described above has the following problems. Specifically, even in the case where the objective lens drive unit is mass produced, the requirement for as many insert molding steps as the intended products makes it impossible to improve the production efficiency. Also, the tracking leaf spring 24 (see FIG. 3) is so thin and small that it cannot be easily handled for insertion into a cavity, which is another factor of low productivity. Further, a spring made of resin easily develops a tilt or is easily affected by secular variations.

A method is known, in which a tracking leaf spring and a focusing leaf spring may be made of the same material and bent together, forming an integral unit. In the unit thus made, the tracking leaf spring has a strain and can hardly attain dynamic characteristic which is axisymmetric. This means that the tracking leaf spring cannot take a correct dynamic behavior in an optical pickup and can hardly process signals correctly in an optical disk apparatus.

The two focusing leaf springs 22 (see FIG. 3), on the other hand, are preferably completely parallel to each other or have the central portion thereof slightly expanded, in consideration of the operation thereof as a parallel link mechanism. In view of this, a small step is formed in the cavity to provide the pair of the focusing leaf springs 24 with an expanded central portion. Nevertheless, it is difficult to form a small step or a desired shape, with high precision.

BRIEF SUMMARY OF THE INVENTION

The object of the present invention is to provide a method capable of mass-producing an objective lens drive unit efficiently.

According to one aspect of the present invention, there is provided a method of manufacturing an objective lens drive unit, comprising a first molding step, wherein a tracking leaf spring having one end coupled to a first coupling member is arranged, with the one end located in a first cavity provided in a molding die, and other end located in a second cavity provided in a wall for holding the tracking leaf spring, and resin is filled in the first and second cavities, thereby forming a first leaf spring support member having an intermediate member located at the one end of the tracking leaf spring; a first separation step of separating the one end of the tracking leaf spring and the first coupling member from each other; a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, the focusing leaf springs being able to swing in a direction which crosses a direction in which the tracking leaf spring is able to swing, the intermediate member being provided between any two focal leaf springs that oppose each other; and a second separation step of separating the one end of each focusing leaf spring from the second coupling member.

According to this invention, the step of molding resin at both the ends of the tracking leaf spring is performed independently of the step of molding resin at both the ends of the focusing leaf spring. In this way, resin can be filled in a multiplicity of works at the same time for an improved working efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6C are perspective views showing the steps of manufacturing the objective lens drive unit.

DETAILED DESCRIPTION OF THE INVENTION

Figure 1:
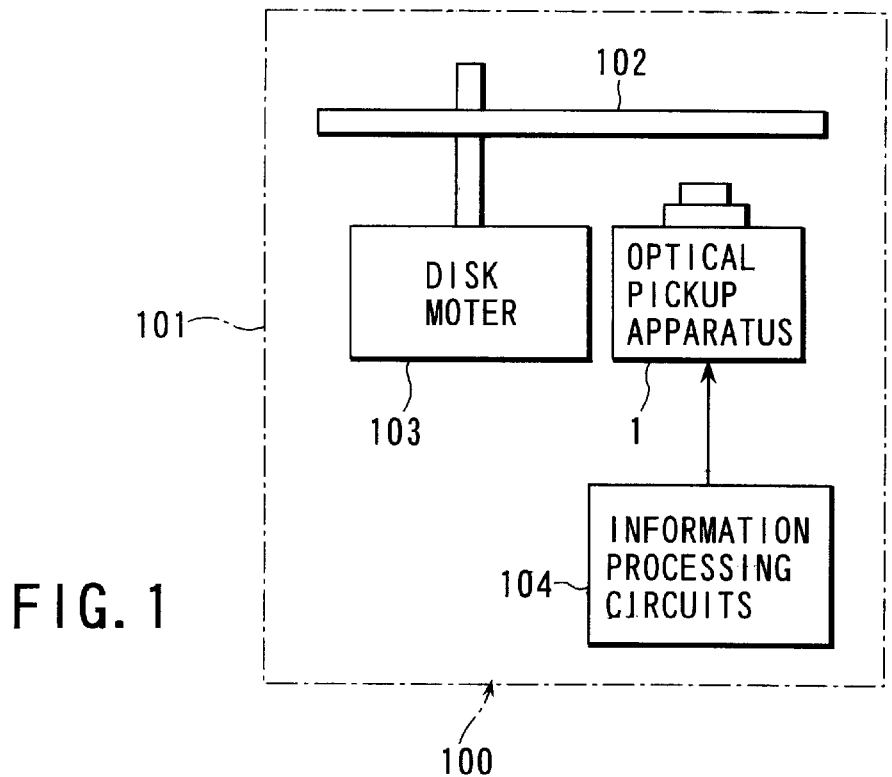
FIG. 1 is a block diagram showing a configuration of an optical disk apparatus.
Figure 2:
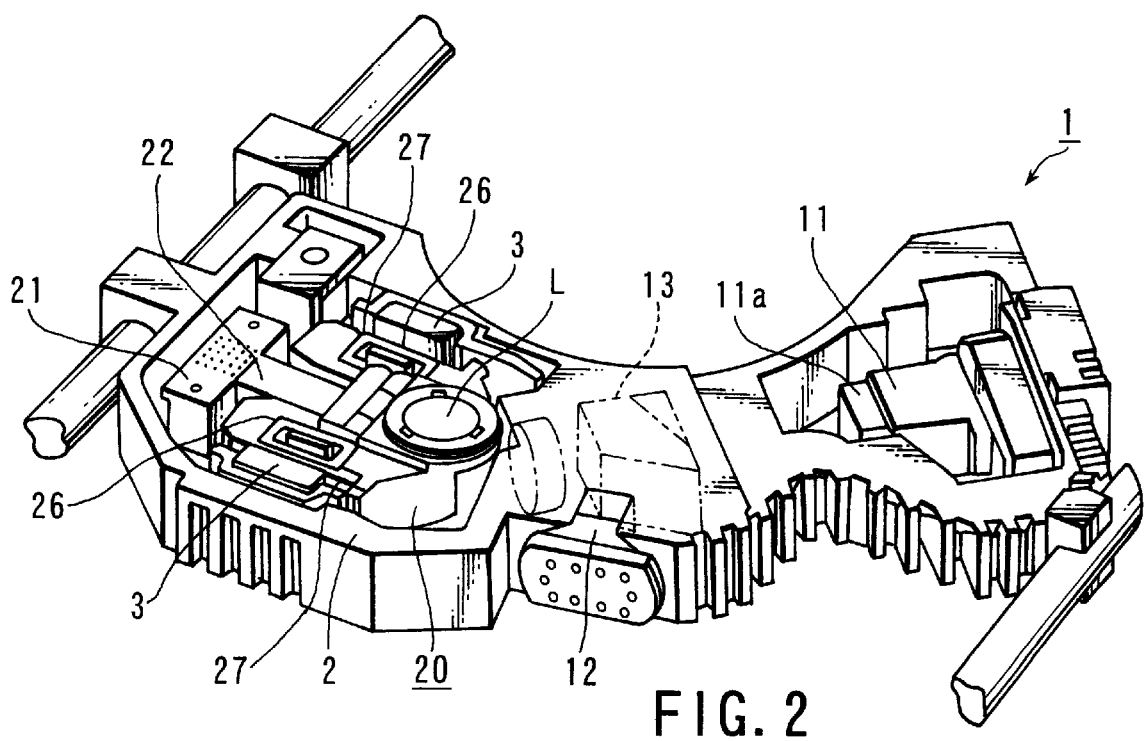
FIG. 2 is a perspective view showing an objective lens drive unit and an optical pickup apparatus according to an embodiment of the present invention.
Figure 3:
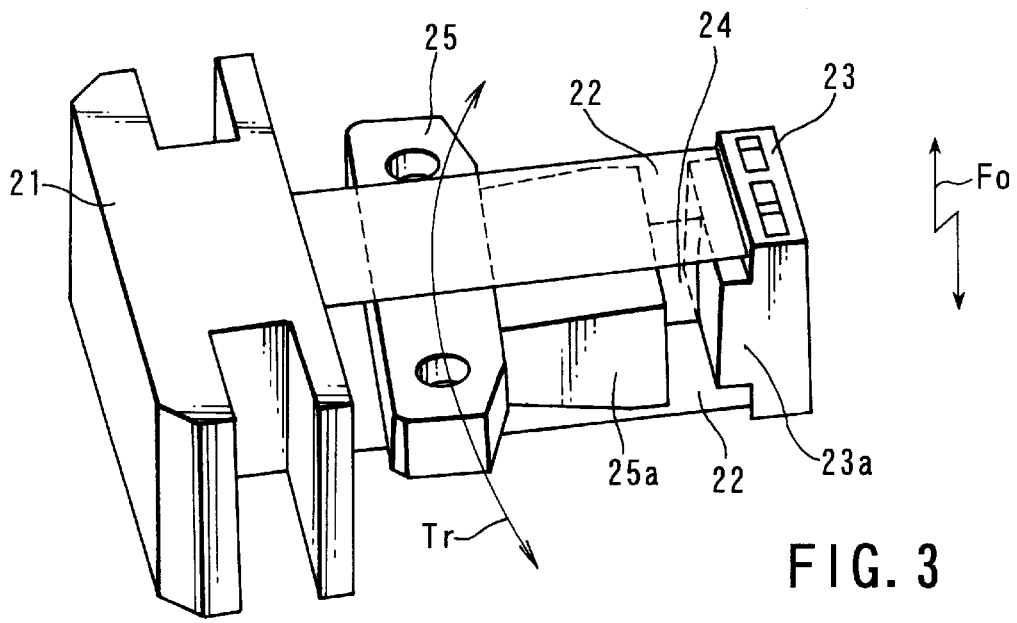
FIG. 3 is a perspective view showing the essential parts of the objective lens drive unit.

FIG. 1 is a block diagram showing a configuration of an optical disk apparatus for reproducing or recording the signal by radiating the laser beam on an optical disk. FIG. 2 is a perspective view showing an optical pickup apparatus 1 built in the optical disk apparatus. FIG. 3 is a perspective view showing the essential parts of an objective lens drive unit 20 built in the optical pickup apparatus 1.

In FIG. 1, reference numeral 100 designates an optical disk apparatus. The optical disk apparatus 100 comprises a housing 101, a disk motor 103 encased in the housing 101 for driving an optical disk 102 rotationally, an optical pickup apparatus 1 arranged in opposed relation to the signal recording surface of the optical disk 102 for radiating the laser beam on the optical disk 102 and receiving the laser beam reflected therefrom, and an information processing circuit 104 for processing the signal supplied from the optical pickup apparatus 1. The optical pickup apparatus 1 is supported movably along the diametrical direction of the optical disk 102.

The optical pickup apparatus 1 comprises an optical base 2. A unit 11 and a unit 12 are mounted on the optical base 2. The unit 11 includes a first light source for outputting a semiconductor laser beam (wavelength of 650 nm), a photo detector and a hologram element 11a integrated with each other, and the unit 12 includes a second light source for outputting a semiconductor laser beam (wavelength of 780 nm) and a photo detector integrated with each other. Further, the optical base 2 arranges thereon a cube-type beam splitter (optical system) 13. The beam splitter 13 introduces the laser beam from the unit 11 and the laser beam from the unit 12 into the same output direction (toward the objective lens L). The beam splitter 13 also branches the light reflected and returned from the same output direction, introduces toward the units 11, 12, respectively, from which they are emitted. The laser beams that have returned to the units 11, 12 are diffracted by the hologram element 11a, enter the photo detector and are converted into an electrical signal.

The objective lens drive unit 20, on the other hand, comprises a stand 21 of resin mounted on the optical base 2 constituting a base member of the optical pickup apparatus 1, an intermediate member 23 of resin mounted on the stand 21 swingably in the focusing direction (in the direction designated by arrow Fo in FIG. 3) through a pair of focusing leaf springs 22, a counterweight 25 mounted on the intermediate member 23 swingably in the tracking direction (in the direction perpendicular to the page) at right angles to the focusing direction through the tracking leaf spring 24 while at the same time holding the objective lens L, and focusing coils 26 and tracking coils 27 mounted on the counterweight 25 through a lens holder. A pair of magnets 3 are mounted on the optical base 2 are disposed in the vicinity of the focusing coils 26 and the tracking coils 27.

The objective lens drive unit 20 controls the position of the objective lens L by supplying a control current to the focusing coils 26 and the tracking coils 27.

The counterweight 25 is composed of a second spring support member 25a and a body 25b for supporting the tracking leaf spring 24. The body 25b is formed of the engineering plastics having a specific gravity of at least 5, and the second spring support member 25a is formed of the engineering plastics such as LCP resin (liquid crystal polymer) which can be injected at a temperature of 100° C. or lower. In the case where Syberus (L204G35BH) manufactured Toray is used as the LCP resin, for example, whose mold temperature is 60 to 70° C. and whose molding pressure is about one third the pressure for PPS (polyphenylene sulfite).

FIGS. 4 to 8 are diagrams showing a method of manufacturing an objective lens drive unit 20 according to a first embodiment of the present invention.

Figure 4:
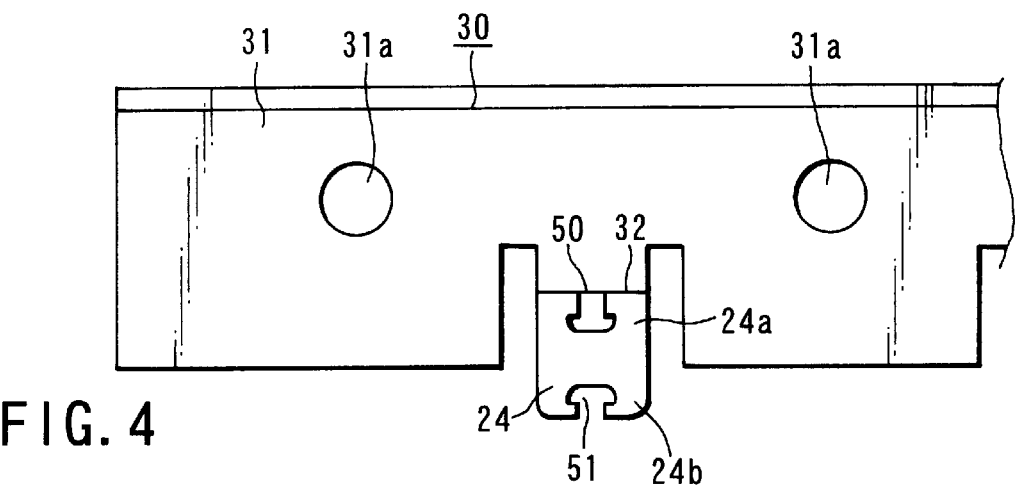
FIG. 4 is a plan view of a first member formed with a tracking leaf spring of the objective lens drive unit.

FIG. 4 is a plan view showing the essential parts of a first member 30. The first member 30 is composed of a first coupling member 31 and a plurality of tracking leaf springs 24 formed integrally with the first coupling member 31. A boundary (first cut portion) 32 between the first coupling member 31 and the tracking leaf springs 24 is a perforated portion, a grooved thin portion, or a stepped portion formed by drawing. The first coupling member 31 is formed with holes 31a for holding it. An end 24a at the first coupling member 31 of the tracking leaf springs 24 is formed with an aperture 50, and the other end 24b is formed with an aperture 51. In the resin-filling process described later, the apertures 50 and 51 strengthen the force with which the resin catches the tracking leaf springs 24 while at the same time securing a smooth resin flow at the time of molding, so that the tracking plate springs 24 are prevented from being deformed or displaced by the flow. The apertures 50, 51 have only to have the operation of engaging therein, even if they are formed of closed holes.

Figure 5:
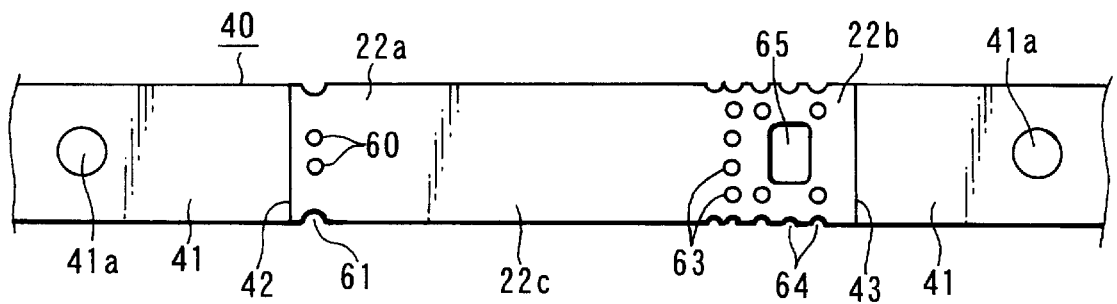
FIG. 5 is a plan view of a second member formed with a focusing leaf spring of the objective lens drive unit.

FIG. 5 is a plan view showing the second member 40 forming the focusing leaf spring 22. The second member 40 is composed of a plurality of focusing leaf springs 22 and second coupling members 41 coupled to each other alternately along the longitudinal direction, and the boundaries (second cut portion) 42, 43 between the focusing leaf springs 22 and the second coupling members 41 are perforated. Each second coupling member 41 is formed with an aperture 41a for holding. Further, an end 22a of each focusing leaf spring 22 is formed with small holes 60 and notches 61, while the other end is formed with small holes 63, notches 64 and a comparatively large hole 65. The hole 65 is located, when arranged in the fourth cavity 74 described later, in opposed relation to a gate 74b described later. In the resin-filling process described later, the small holes 60, the notches 61, the small holes 63, the notches 64 and the hole 65 increase the force with which the resin catches the focusing leaf springs 22. The holes 63, 65 may also alternatively be notches.

Figure 7A:
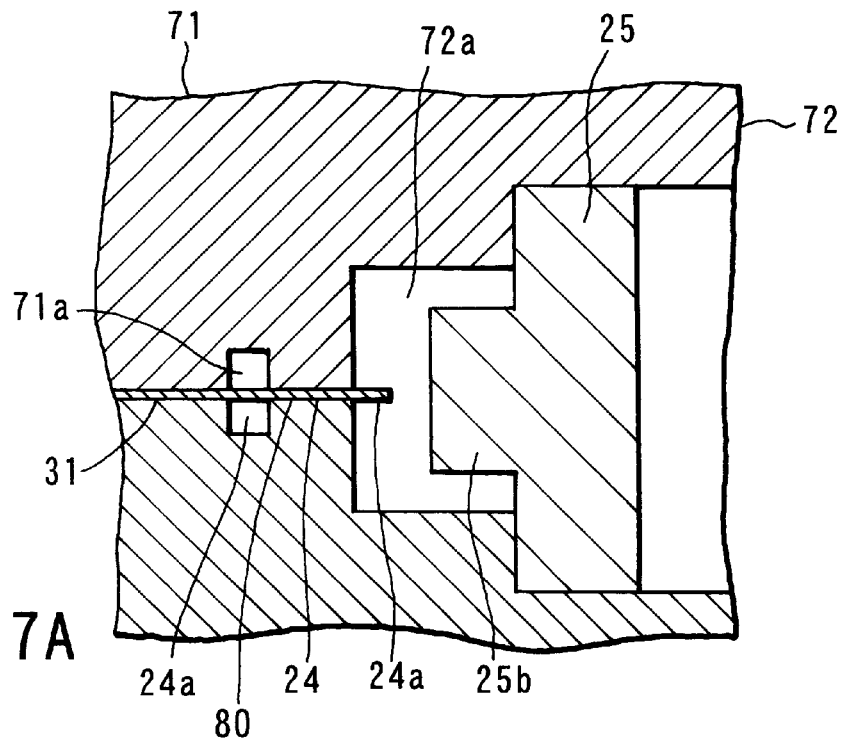
FIGS. 7A and 7B are sectional views of first to fourth cavities for forming the objective lens drive unit.

The process for manufacturing the objective lens drive unit 20 will be explained. As shown in FIGS. 6A and 7A, the first coupling member 31 of the first member 30 is held by fitting a positioning rod at a position designated by the hole 31a and placing the remaining portion on the cavity. One end 24a of each tracking leaf spring 24 is arranged in position in the first cavity 71a of the die 71, and the other end 24b thereof is set in position in the second cavity 72a of the die 72. Also, the protrusion portion of the body of counterweight 25 is set in position in the second cavity 72a. The first cavity 71a and the second cavity 72a are formed in a single die through a holder 80. A plurality of first cavities 71a and second cavities 72a are formed along the first member 30 and filled with resin at the same time.

Since the tracking leaf spring 24 is clamped between the dies 71 and 72 at this time, its positional relation to the counter weight 25 would not be impaired, in spite of the flow resistance of the resin.

The resin is filled in the first cavity 71a and the second cavity 72a. As a result, a first support member 23a of the intermediate member 23 is formed in the first cavity 71a, and a second spring support member 25a for coupling the counterweight 25 and the tracking leaf spring 24 is formed in the second cavity 72a.

The second spring support member 25a is injection-molded at a low die temperature of 60 to 70° C., and therefore the body 25b of the counterweight 25 is not softened or deformed.

The first coupling member 31 and the tracking leaf spring 24 are cut off and separated from each other at the boundary 32. This cutting process can be performed easily and accurately since the boundary 32 is perforated. The perforation can be replaced with a V-groove or a step formed by drawing. The perforation, however, has the advantage of simplifying the manufacture process and reducing the chance of a cutting failure.

Figure 7B:
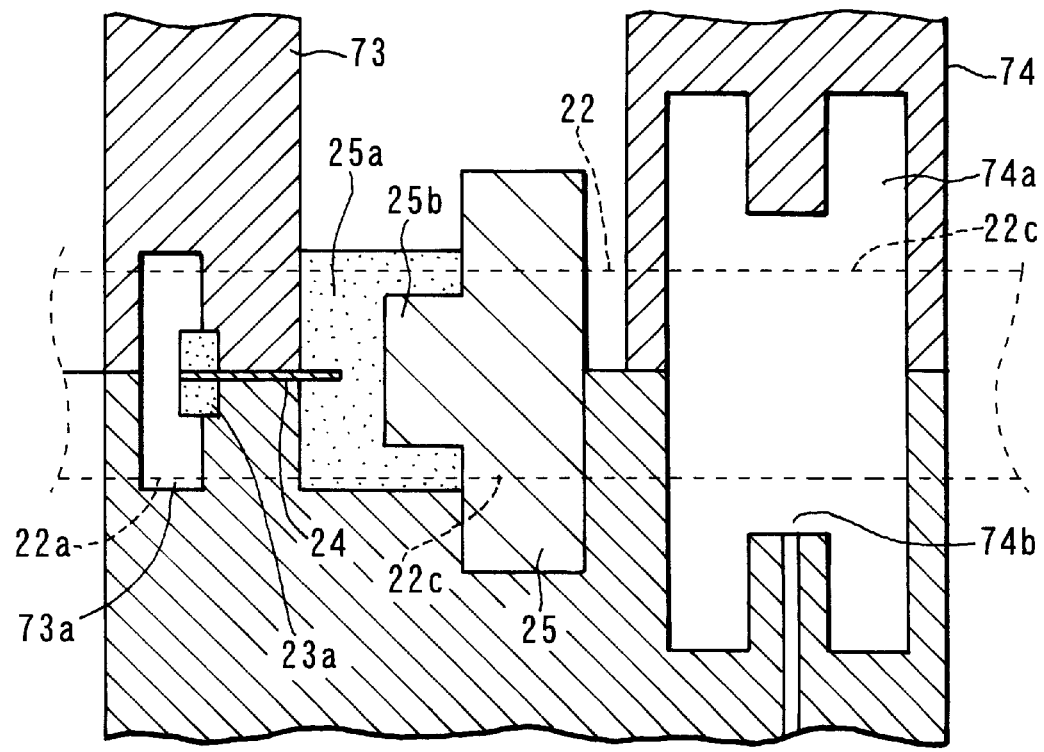

As shown in FIG. 7B, the first support member 23a of the intermediate member 23 is set in position in a third cavity 73a of a third die 73. An end 22a of the focusing leaf spring 22 is set in position in the third cavity 73a, and the other end 22b of the focusing leaf spring 22 is set in position in a fourth cavity 74a of the fourth die 74. A plurality of the third cavities 73a and the fourth cavities 74a are formed along the second member 40 and filled with resin at the same time.

Resin is filled in the third cavity 73a and the fourth cavity 74a. As a result, the intermediate member 23 is formed in the third cavity 73a, and a stand 21 is formed in the fourth cavity 74a.

Figure 8A:
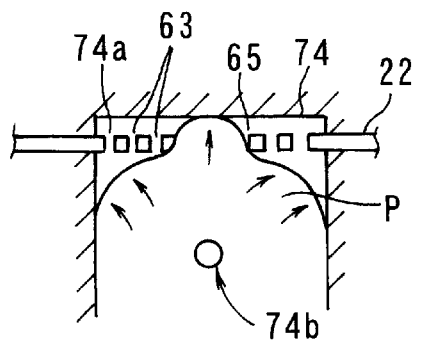
FIGS. 8A to 8D are sectional views showing the manner in which resin flows in the fourth cavity.
Figure 8B:
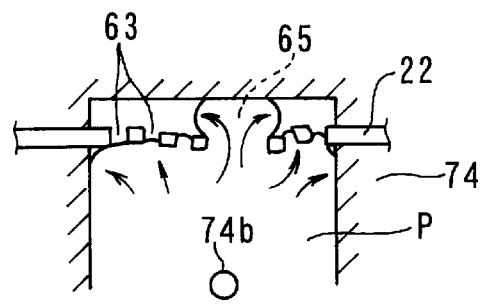
Figure 8C:
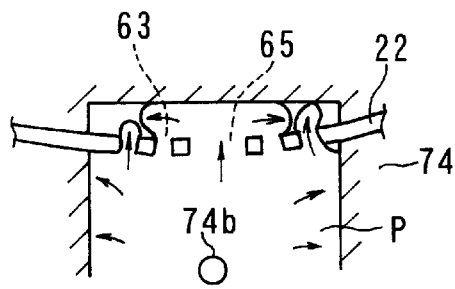
Figure 8D:
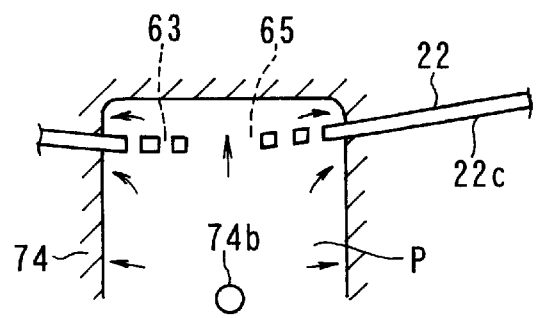

The process of filling resin in the fourth cavity 74a will be explained with reference to FIGS. 8A to 8D. Specifically, as shown in FIG. 8A, resin P, when injected by way of a gate 74b, expands in the fourth cavity 74a. When the resin P reaches the focusing leaf spring 22, the resin P passes through the hole 65 and the small holes 63 of the focusing leaf spring 22 as shown in FIG. 8B. In the process, more resin transmits through the hole 65 than through the small holes 63. Therefore, the force of the resin whose flow is restricted by the fourth cavity 74a presses the hole 65 inward the fourth cavity 74a, so that the end 22b of the focusing leaf spring 22 is displaced and recessed. As shown in FIG. 8C, with the focusing leaf spring 22 displaced, the resin P transmits through the small holes 63, and as shown in FIG. 8D, expands over the whole interior of the fourth cavity 74a. As a result, the intermediate member 23 is formed in the third cavity 73a, and the stand 21 is formed in the fourth cavity 74a.

Since the focusing leaf spring 22 is recessed into the fourth cavity 74a (protruded toward the gate 74b), the central portion 22c of the focusing leaf spring 22 outside the fourth cavity 74a expands like a drum.

The boundaries 42, 43 of the second member 40 are cut off thereby separating the second coupling member 41 and the focusing leaf spring 22 from each other. The boundaries 42, 43, which are perforated, can be cut easily and accurately. The perforation can be replaced with a V-groove or a step formed by drawing. The perforation, however, has the advantage of simplifying the manufacture process and reducing the chance of a cutting failure.

The objective lens drive unit 20, the units 11, 12 and the beam splitter 13 produced in this way are assembled on the optical base 2 thereby completing the optical pickup apparatus 1. Further, the pickup apparatus 1 is mounted at a predetermined position in the housing 101 thereby completing the optical disk apparatus 100.

As described above, according to this embodiment, the process for molding the resin at both the ends of the tracking leaf spring 24 and the process for molding the resin at both the ends of the focusing leaf spring 22 are conducted independently of each other. Therefore, the process of filling resin for a multiplicity of works can be carried out at the same time for an improved working efficiency.

The molding die, which is a member having high rigidity, holds the tracking leaf spring 24, forming the intermediate member 23. Hence, the objective lens drive unit can be manufactured in large quantities, each with the components set in precise positional relation.

The tracking leaf spring 24, which is integrated as the first member 40 by the first coupling member 31 before molding the first support member 23a, can be easily handled by the holder or the like, and can be set in position accurately in a short time. The focusing leaf spring 22, which is similarly integrated as the second member 40 by the second coupling member 41, can be handled easily by the holder and the like and set in position accurately in a short time.

Further, the boundary between the tracking leaf spring 24 and the first coupling member 31 and the boundary between the focusing leaf spring 22 and the second coupling member 41 are formed with a perforation portion, a grooved thin portion or a step formed by drawing. Therefore, the cutting work can be performed easily in a short time. In addition, the tracking leaf spring 24 and the focusing leaf spring 22 are not easily damaged. Thus, a high-quality product can be supplied.

Furthermore, the second spring support member 25a is formed of CP resin. Therefore, the body 25b of the counterweight 25 is not softened at the time of injection molding, and therefore can maintain a high dimensional accuracy. As a result, the process can be passed to the next step without inspection or cleaning, and the molding yield can be improved without reducing the production efficiency. Also, since the die temperature is kept low at the time of molding, resin can be easily inserted, and the worker security is improved.

On the other hand, since the objective lens drive unit manufactured in the manner described above is used, the optical pickup apparatus having the optical lens drive unit built therein can be prevented tilt from generating or influence due to the secular variations of the spring, as compared with the resin spring. Therefore, the accuracy of operation of the optical disk along the radial direction and the tracking direction can be maintained for a long time. Also, the optical disk apparatus having such an optical pickup apparatus built therein can perform the read and write operation in stable manner even in the case where the characteristics of the optical disk are unstable.

FIGS. 9 to 11A, 11B, 11C are diagrams showing a method of manufacturing the objective lens drive unit 20 according to a second embodiment of the present invention. In FIGS. 9 to 11A, 11B, 11C, the same component parts as the corresponding parts in FIGS. 7A, 7B, 8A to 8D are designated by the same reference numerals, respectively, and will be omitted the detailed description thereof.

Figure 9:
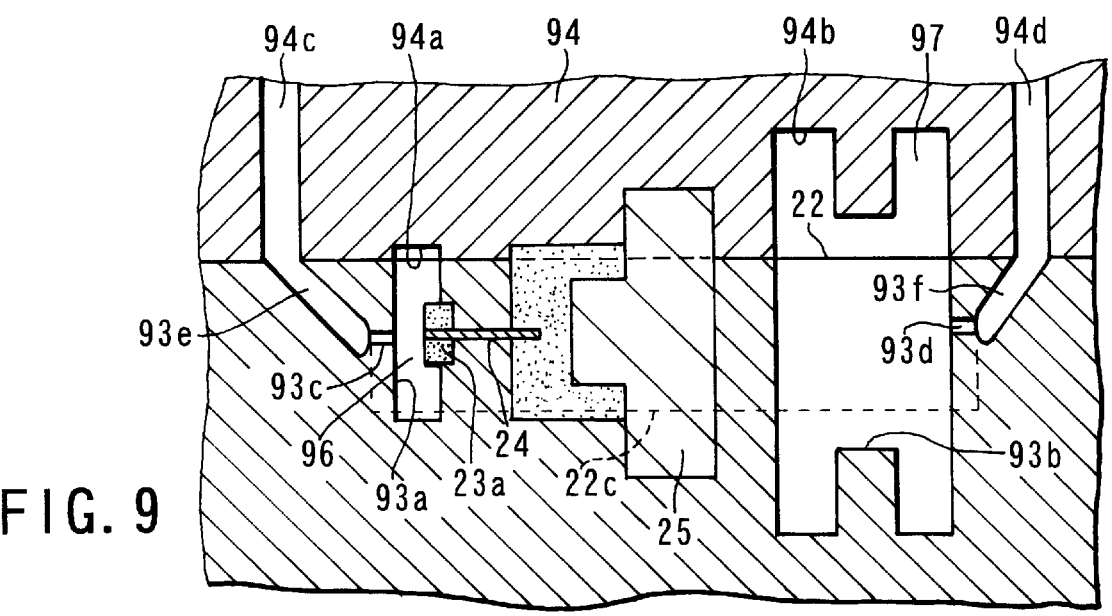
FIG. 9 is a sectional view of the first to fourth cavities for forming the objective lens drive unit.
Figure 10A:
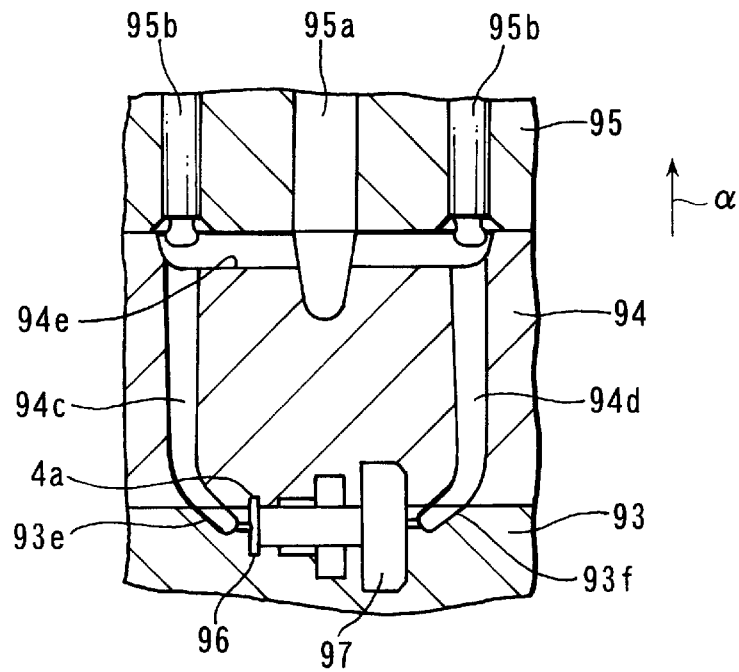
FIGS. 10A and 10B are sectional views of a die constituting the first to fourth cavities.
Figure 10B:
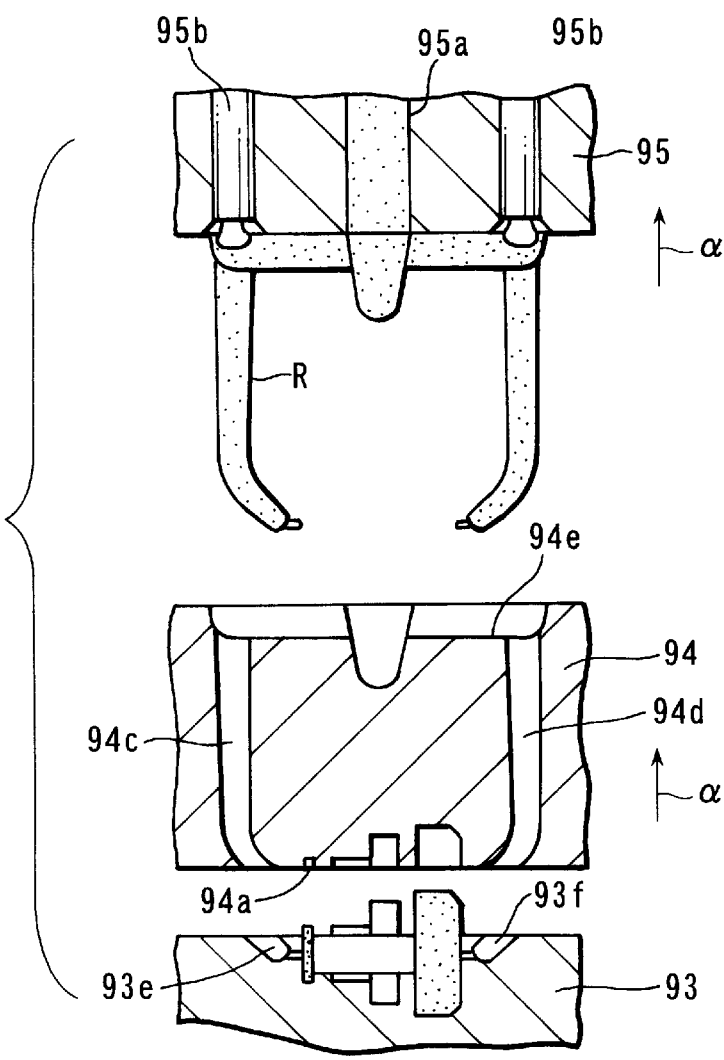

FIGS. 9 and 10A, 10B are diagrams showing dies. Specifically, dies comprise a third die (lower die) 93, a fourth die (upper die) 94 and a runner strip plate 95.

The third die 93 comprises a first recess 93a, a second recess 93b, a first gate 93c connected to the first recess 93a, a second gate 93d connected to the second recess 93b, a first runner 93e connected to the first gate 93c, and a second runner 93f connected to the second gate 93d. The first runner 93e and the second runner 93f are inclined toward the fourth die 94 and connected to the first gate 93c and the second gate 93d, respectively.

The first gate 93c and the second gate 93d are arranged at such positions as to lie in the same plane as the tracking leaf spring 24 when the latter is set in the third die 93. By doing so, the symmetry of the resin body filled is improved at a time of injection.

The fourth die 94 comprises a first recess 94a, a second recess 94b, a first pinpoint gate 94c connected to the first recess 94a, a second pinpoint gate 94d connected to the second recess 94b, and a runner 94e.

The third cavity 96 is formed of the first recess 93a of the third die 93 and the first recess 94a of the fourth die 94, while the fourth cavity 97 is formed of the second recess 93b of the third die 93 and the second recess 94b of the fourth die 94.

The runner strip plate 95 is formed with a sprue 95a through which to supply resin from an external source, and a runner lock pin 95b adapted to engage the resin filled in the runner 94e.

As shown in FIG. 9, the first support member 23a of the intermediate member 23 is set in position in the first recess 93a of the third die 93. Also, one ends 22a of a pair of the focusing leaf springs 22 are set in position in the third cavity 96, and the other ends 22b of the focusing leaf spring pair 22 are set in position in the second recess 93b of the third die 93. A plurality of the third cavities 96 and the fourth cavities 97 are arranged along the second member 40 and adapted to be filled with resin at the same time.

The resin is filled in the third cavity 96 and the fourth cavity 97. As a result, the intermediate member 23 is formed in the third cavity 96, and the stand 21 is formed in the fourth cavity 97.

Figure 11A:
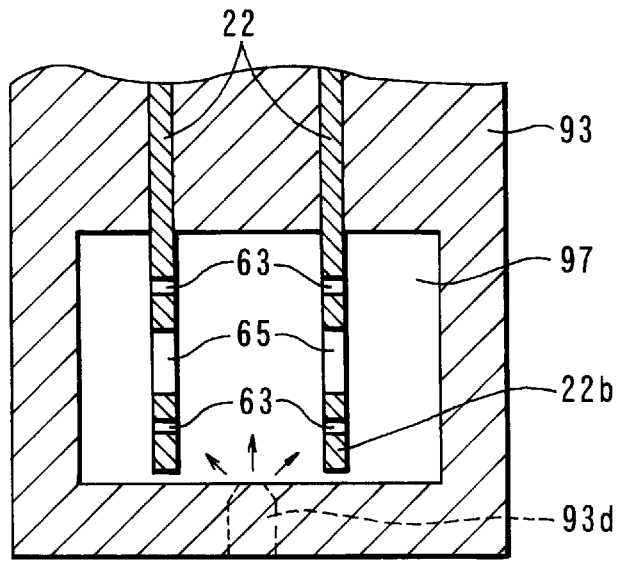
FIGS. 11A, 11B and 11C are transverse sectional views showing the manner in which resin flows in the die.
Figure 11B:
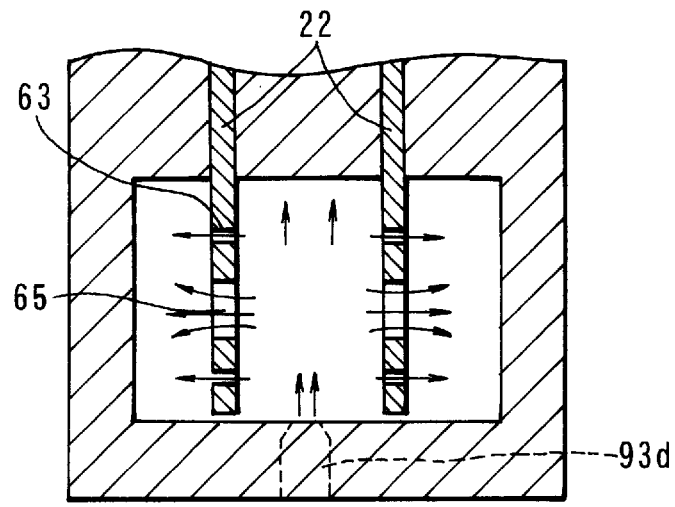
Figure 11C:
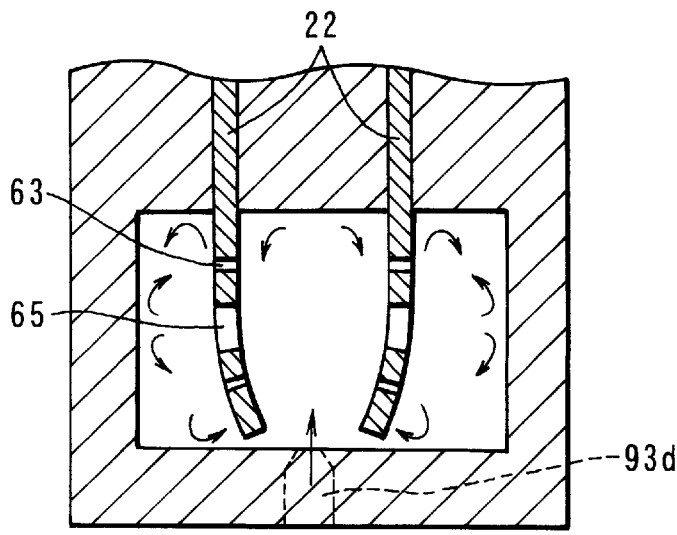

The process for filling resin in the fourth cavity 97 will be explained with reference to FIGS. 11A to 11C. Specifically, as shown in FIG. 11A, the resin P, when injected from the second gate 93d, expands in the fourth cavity 97. When the resin P reaches the focusing leaf springs 22, as shown in FIG. 11B, it transmits through the holes 65 and the small holes 63 of the focusing leaf springs 22. Since more resin is transmitted through the holes 65 than through the small holes 63, the force of the resin whose flow is restricted by the fourth cavity 97 presses the holes 65 inward the fourth cavity 97, so that the other ends 22b of the focusing leaf springs 22 are displaced inward of each other. As shown in FIG. 11C, the resin P transmits through the small holes 63 with the focusing leaf springs 22 displaced, and expands over the whole interior of the fourth cavity 97. As a result, the intermediate member 23 is formed in the third cavity 93, and the stand 21 is formed in the fourth cavity 97.

On the other hand, since the focusing leaf springs 22 are recessed in the fourth cavity 97 (protruded toward the gate 93d), the central portion of each focusing leaf spring 22 expands like a drum outside the fourth cavity 97.

The runner strip plate 95 is lifted in the direction of arrow α in FIG. 10B thereby pulling off the resin in the runner 94e, the pinpoint gates 94c, 94d from the fourth die 94. Since the runners 93e, 93f are inclined toward the fourth die 94, the resin in the runners 93e, 93f can also be easily pulled off.

Then, the fourth die 94 is lifted in the direction of arrow α in FIG. 10B and the mold are taken out. The resin in the gates 93c, 93d extends somewhat when lifting the runner strip plate 95 and a small part thereof remains on the intermediate member 23 and the stand 21. The amount that so remains is so small that the effect thereof on the operation of the objective lens drive unit 20 is negligible, and therefore need not be removed.

As described above, according to the second embodiment, an effect similar to the first embodiment can be obtained, and the resin can be injection-molded uniformly in the direction required for maintaining the symmetry when forming the intermediate member 23 and the stand 21. Thus, the symmetry of the focusing leaf springs 22 can be maintained. As a result, the objective lens drive unit 20 can exhibit a predetermined performance, while at the same time improving the performance of the optical pickup apparatus 1 and the optical disk apparatus 100. Also, the process for separating the intermediate member 23 from the resin in the stand 21 and the runners 93e, 93f is eliminated.

The present invention is not limited to the embodiments described above, but can of course be embodied in various modifications without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing an optical pickup apparatus, comprising:

a step of manufacturing an objective lens drive unit; and an assembly step of fixing, on a optical base, at least the objective lens drive unit, a light source, and an optical system for leading the light fluxes from the light source to the objective lens drive unit, wherein said step of manufacturing an objective lens drive unit comprises:

a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;

a first separation step of separating said one end of the tracking leaf spring and the first coupling member from each other;

a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and a second separation step of separating said one end of each focusing leaf spring from the second coupling member.

2. An optical pickup apparatus comprising:

an objective lens drive unit;

a light source;

an optical system for leading the light fluxes from the light source to the objective lens drive unit; and an optical base holding the objective lens drive unit, the light source and the optical system, wherein said objective lens drive unit is one manufactured by a method comprising:
a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;
a first separation step of separating said one end of the tracking leaf spring and the first coupling member from each other;
a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and
a second separation step of separating said one end of each focusing leaf spring from the second coupling member.

3. An optical pickup apparatus comprising:
an objective lens drive unit;
a light source;
an optical system for leading the light fluxes from the light source to the objective lens drive unit; and
an optical base holding the objective lens drive unit, the light source and the optical system,
wherein said objective lens drive unit is one manufactured by a method comprising:
a first molding step, wherein a plurality of tracking leaf springs are arranged side by side, forming an array, each having one end coupled to a first coupling member at a separation line, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of each tracking leaf spring;
a first separation step of separating said one end of each tracking leaf spring and the first coupling member from each other, at the separation line;
a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and a second separation step of separating said one end of each focusing leaf spring from the second coupling member.

4. An optical pickup apparatus comprising:
an objective lens drive unit;
a light source;
an optical system for leading the light fluxes from the light source to the objective lens drive unit; and
an optical base holding the objective lens drive unit, the light source and the optical system,
wherein said objective lens drive unit is one manufactured by a method comprising:
a first molding step, wherein tracking leaf spring having one end coupled to a first coupling member is arranged, with said one end coupled to a first coupling member at a separation line, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;
a first separation step of separating said one end of the tracking leaf spring and the first coupling member from each other;
a second molding step, wherein at least two sets of focusing leaf springs are connected with second coupling members, each focusing leaf spring having one end coupled to one second coupling member at a separation line and located in a third cavity and the other end located in a fourth cavity, and resin is filled in the third and fourth cavities, thereby securing each focusing leaf spring to the intermediate member, said focusing leaf springs being able to swing in a direction which crosses a direction in which the tracking leaf spring is able to swing, said intermediate member being provided between any two focal leaf springs that oppose each other; and
a second separation step of separating said one end of each focusing leaf spring from the second coupling member at the separating line.

5. An optical disk apparatus comprising:
an optical pickup apparatus;
a drive motor for rotationally driving an optical disk;
an information processing unit for processing the signal supplied from the optical pickup apparatus; and
a housing accommodating the optical pickup apparatus, the drive motor and the information processing unit,
wherein said optical pickup apparatus has an objective lens drive unit, a light source, an optical system for leading the light fluxes from the light source to the objective lens drive unit, and an optical base holding the objective lens drive unit, the light source and the optical system, said objective lens drive unit having been manufactured by a method comprising:
a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;

a first separation step of separating said one end of the tracking leaf spring and the first coupling member from each other;

a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and a second separation step of separating said one end of each focusing leaf spring from the second coupling member.

6. A method of manufacturing an optical pickup apparatus, comprising:

a step of manufacturing an objective lens drive unit; and an assembly step of fixing, on a optical base, the objective lens drive unit, a light source, and an optical system for leading the light fluxes from the light source to the objective lens drive unit, wherein said step of manufacturing an objective lens drive unit comprises:

a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;

a first separation step of separating said one end of the tracking leaf spring and the first coupling member from each other;

a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and a second separation step of separating said one end of each focusing leaf spring from the second coupling member, said third cavity and said fourth cavity being ones provided in an injection molding die which comprises:

a lower die;

an upper die;

a plurality of gates formed on the lower die and extending in a direction perpendicular to a direction in which the lower and upper dies are opened and closed, for guiding resin into a cavity formed when the lower die and the upper die are closed together; and a plurality of runners, each inclined to the upper die and having one end connected to the corresponding gate and the other end provided in the upper die.

7. A method of manufacturing an optical disk apparatus, comprising:

a first assembly step of fixing, on a optical base, an objective lens drive unit, a light source, and an optical system for leading the light fluxes from the light source to the objective lens drive unit; and a second assembly step of securing, in a housing, an optical pickup apparatus, a drive motor for rotationally driving an optical disk, and an information processing unit for processing the signal supplied from the optical pickup apparatus, wherein said objective lens drive unit is one manufactured by a method comprising:

a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;

a first separation step of separating said one end of the tracking leaf spring and the first coupling member from each other;

a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and a second separation step of separating said one end of each focusing leaf spring from the second coupling member, said third cavity and said fourth cavity being ones provided in an injection molding die which comprises:

a lower die;

an upper die;

a plurality of gates formed on the lower die and extending in a direction perpendicular to a direction in which the lower and upper dies are opened and closed, for guiding resin into a cavity formed when the lower die and the upper die are closed together; and a plurality of runners, each inclined to the upper die and having one end connected to the corresponding gate and the other end provided in the upper die.

8. An optical pickup apparatus comprising:

an objective lens drive unit;

a light source;

an optical system for leading the light fluxes from the light source to the objective lens drive unit; and an optical base holding the objective lens drive unit, the light source and the optical system, wherein said objective lens drive unit is one manufactured by a method comprising:
   a first molding step, wherein tracking leaf spring having one end coupled to a first coupling member is arranged, with said one end coupled to a first coupling member at a separation line, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;
   a first separation step of separating said one end of the tracking leaf spring and the first coupling member from each other;
   a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing each focussing leaf spring to the intermediate member, said focusing leaf springs being able to swing in a direction which crosses a direction in which the tracking leaf spring is able to swing, said intermediate member being provided between any two focal leaf springs that oppose each other; and
   a second separation step of separating said one end of each focusing leaf spring from the second coupling member,
   said third cavity and said fourth cavity being ones provided in an injection molding die which comprises:
      a lower die;
      an upper die;
      a plurality of gates formed on the lower die and extending in a direction perpendicular to a direction in which the lower and upper dies are opened and closed, for guiding resin into a cavity formed when the lower die and the upper die are closed together; and
      a plurality of runners, each inclined to the upper die and having one end connected to the corresponding gate and the other end provided in the upper die.

9. An optical disk apparatus comprising:
   an optical pickup apparatus;
   a drive motor for rotationally driving an optical disk;
   an information processing unit for processing the signal supplied from the optical pickup apparatus; and
   a housing accommodating the optical pickup apparatus, the drive motor and the information processing unit,
   wherein said optical pickup apparatus has an objective lens drive unit, a light source, an optical system for leading the light fluxes from the light source to the objective lens drive unit, and an optical base holding the objective lens drive unit, the light source and the optical system, said objective lens drive unit having been manufactured by a method comprising:
      a first molding step, wherein a tracking leaf spring having one end coupled to a first coupling member is arranged, with said one end located in a first cavity provided in a molding die, and other end located in a second cavity provided in a wall for holding the tracking leaf spring, and resin is filled in the first and second cavities, thereby forming a first leaf spring support member having an intermediate member located at said one end of the tracking leaf spring;
      a first separation step of separating said one end of the tracking leaf spring and the first coupling member from each other;
      a second molding step, wherein at least two sets of focusing leaf springs are connected with second coupling members, each focusing leaf spring having one end coupled to one second coupling member and located in a third cavity and the other end located in a fourth cavity, and resin is filled in the third and fourth cavities, thereby securing said one end and other end of each focussing leaf spring to the intermediate member, said focusing leaf springs being able to swing in a direction which crosses a direction in which the tracking leaf spring is able to swing, said intermediate member being provided between any two focal leaf springs that oppose each other; and
      a second separation step of separating said one end of each focusing leaf spring from the second coupling member.

\* \* \* \* \*